(12) United States Patent
Song et al.

(10) Patent No.: US 9,274,749 B2
(45) Date of Patent: Mar. 1, 2016

(54) MOBILE TERMINAL AND CONTROLLING METHOD THEREOF

(71) Applicant: LG ELECTRONICS INC., Seoul (KR)

(72) Inventors: Hosung Song, Seoul (KR); Junho Lee, Seoul (KR); Sunkuk Moon, Seoul (KR); Keansub Lee, Seoul (KR); Sangkeun Oh, Seoul (KR); Mina Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 216 days.

(21) Appl. No.: 14/027,015

(22) Filed: Sep. 13, 2013

(65) Prior Publication Data

US 2014/0089805 A1 Mar. 27, 2014

(30) Foreign Application Priority Data

Sep. 21, 2012 (KR) .................. 10-2012-0104944

(51) Int. Cl.
| | |
|---|---|
| G06F 3/048 | (2013.01) |
| G06F 3/16 | (2006.01) |
| G06Q 10/10 | (2012.01) |
| G06F 3/0482 | (2013.01) |
| G06F 3/0488 | (2013.01) |
| G06F 3/0481 | (2013.01) |

(52) U.S. Cl.
CPC .............. *G06F 3/167* (2013.01); *G06F 3/0482* (2013.01); *G06F 3/04817* (2013.01); *G06F 3/04883* (2013.01); *G06Q 10/109* (2013.01); *H04M 2250/68* (2013.01)

(58) Field of Classification Search
CPC ............................ G06F 3/04883; G06F 3/0481
USPC .................................................. 715/727, 728
See application file for complete search history.

(56) References Cited

U.S. PATENT DOCUMENTS

| | | | | |
|---|---|---|---|---|
| 6,522,347 | B1* | 2/2003 | Tsuji ...................... | G06Q 30/02 345/419 |
| 6,678,864 | B1* | 1/2004 | Tsai ...................... | H04L 63/083 715/229 |
| 8,005,500 | B2* | 8/2011 | Park .................... | H04M 1/6041 455/550.1 |
| 2003/0003897 | A1* | 1/2003 | Hyon .................. | H04M 1/7255 455/413 |
| 2005/0183026 | A1* | 8/2005 | Amano ................. | G06F 1/1616 715/764 |
| 2006/0020894 | A1* | 1/2006 | Ejima .................... | G11B 27/34 715/721 |
| 2007/0127888 | A1* | 6/2007 | Hayashi ............... | G11B 27/322 386/230 |
| 2008/0090609 | A1 | 4/2008 | Walter et al. | |
| 2010/0004010 | A1* | 1/2010 | Shin ...................... | H04L 12/581 455/466 |
| 2010/0153887 | A1* | 6/2010 | Yamaguchi ............ | G06Q 10/00 715/854 |
| 2010/0309147 | A1* | 12/2010 | Fleizach ............. | G06F 3/04883 345/173 |

(Continued)

OTHER PUBLICATIONS

European Patent Office Application Serial No. 13004582.6, Search Report dated Jan. 9, 2015, 8 pages.

*Primary Examiner* — Daeho Song
(74) *Attorney, Agent, or Firm* — Lee, Hong, Degerman, Kang & Waimey

(57) ABSTRACT

A mobile terminal and controlling method thereof are disclosed, which facilitates a terminal to be used in further consideration of user's convenience. The present invention includes saving a first memo sheet including at least one memo object and at least one audio memo object for the first memo sheet, displaying the first memo sheet to be displayed on a touchscreen, and when a prescribed memo object is selected from the at least one memo object displayed on the first memo sheet, controlling an audio memo object corresponding to the selected memo object to be outputted via an audio output unit. Accordingly, a voice memo content and other memo contents can be efficiently recorded and read.

20 Claims, 16 Drawing Sheets

(56) References Cited

U.S. PATENT DOCUMENTS

| | | | |
|---|---|---|---|
| 2011/0099006 A1* | 4/2011 | Sundararaman | H04L 12/1831 704/208 |
| 2012/0035925 A1* | 2/2012 | Friend et al. | 704/235 |
| 2012/0036220 A1* | 2/2012 | Dare | G06F 8/61 709/217 |
| 2012/0105703 A1* | 5/2012 | Lee | G06T 11/60 348/333.11 |
| 2012/0311499 A1* | 12/2012 | Dellinger | H04N 5/23206 715/835 |
| 2012/0329398 A1* | 12/2012 | Kalhous | H04W 4/046 455/41.3 |
| 2013/0021270 A1* | 1/2013 | Lee | G06F 3/04817 345/173 |
| 2013/0054229 A1* | 2/2013 | Jeon | H04M 1/656 704/201 |
| 2013/0080966 A1* | 3/2013 | Kikin-Gil | G06F 3/0483 715/776 |
| 2013/0145024 A1* | 6/2013 | Cao | H04L 67/22 709/224 |
| 2014/0056417 A1* | 2/2014 | Wildman | G06F 19/327 379/67.1 |

* cited by examiner

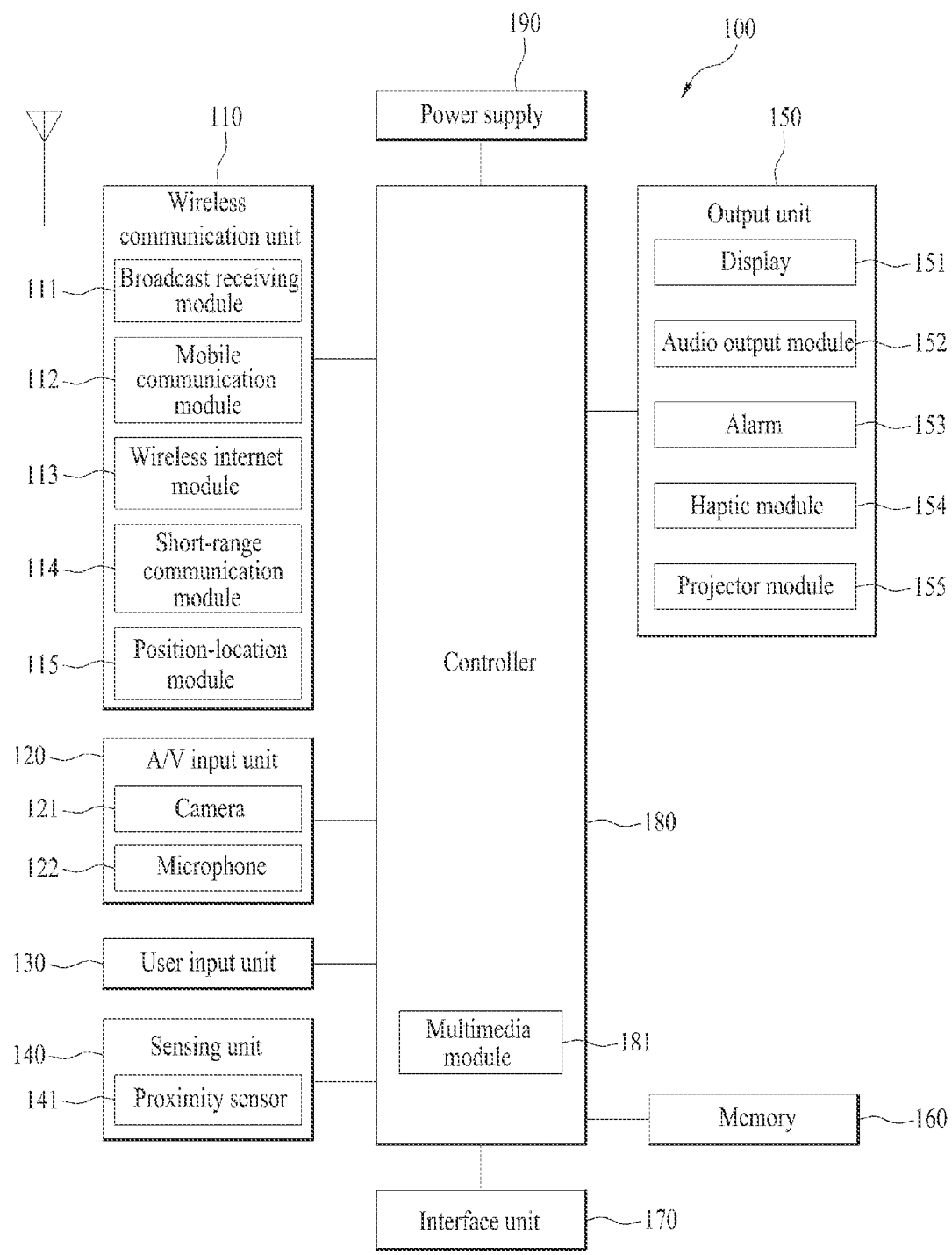

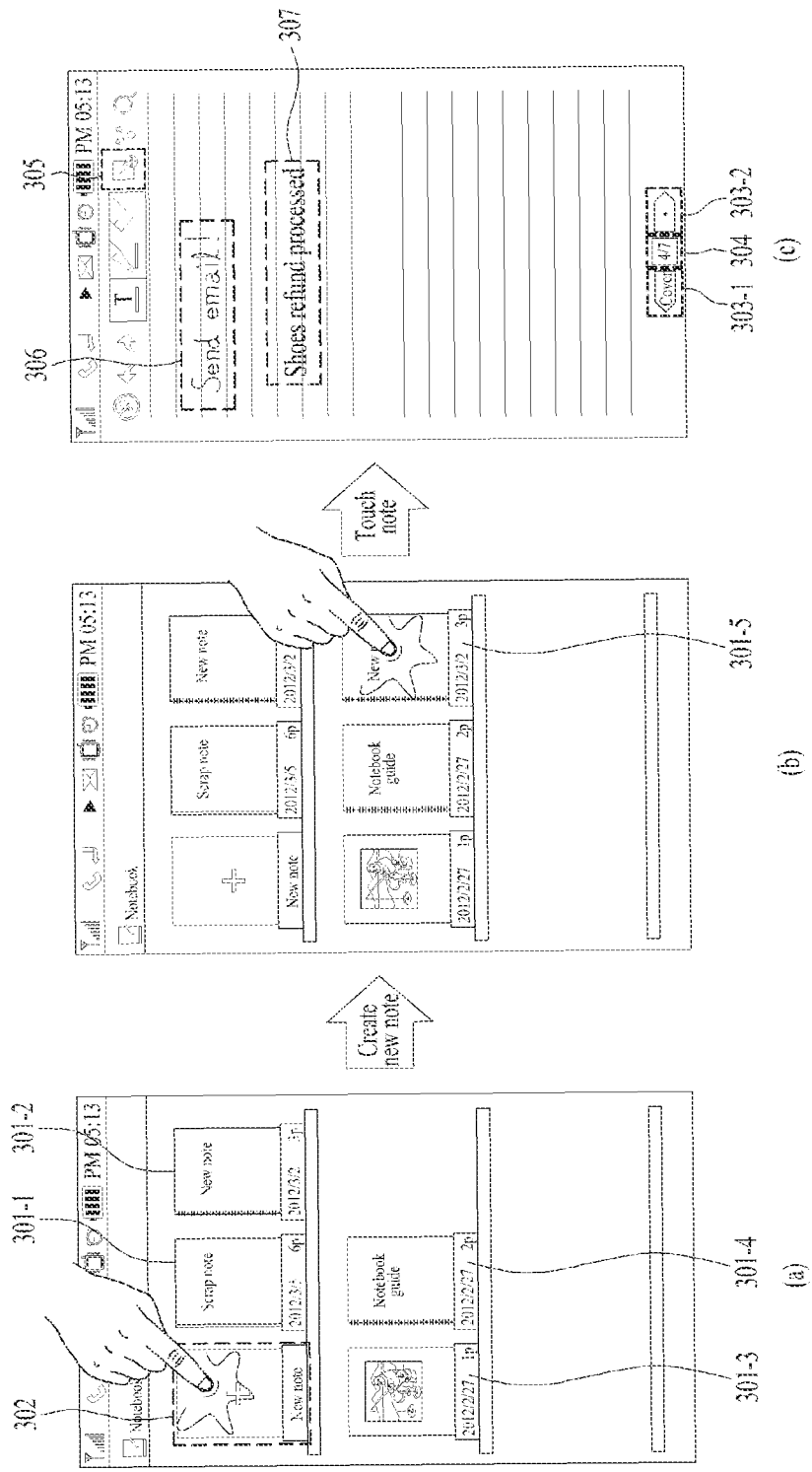

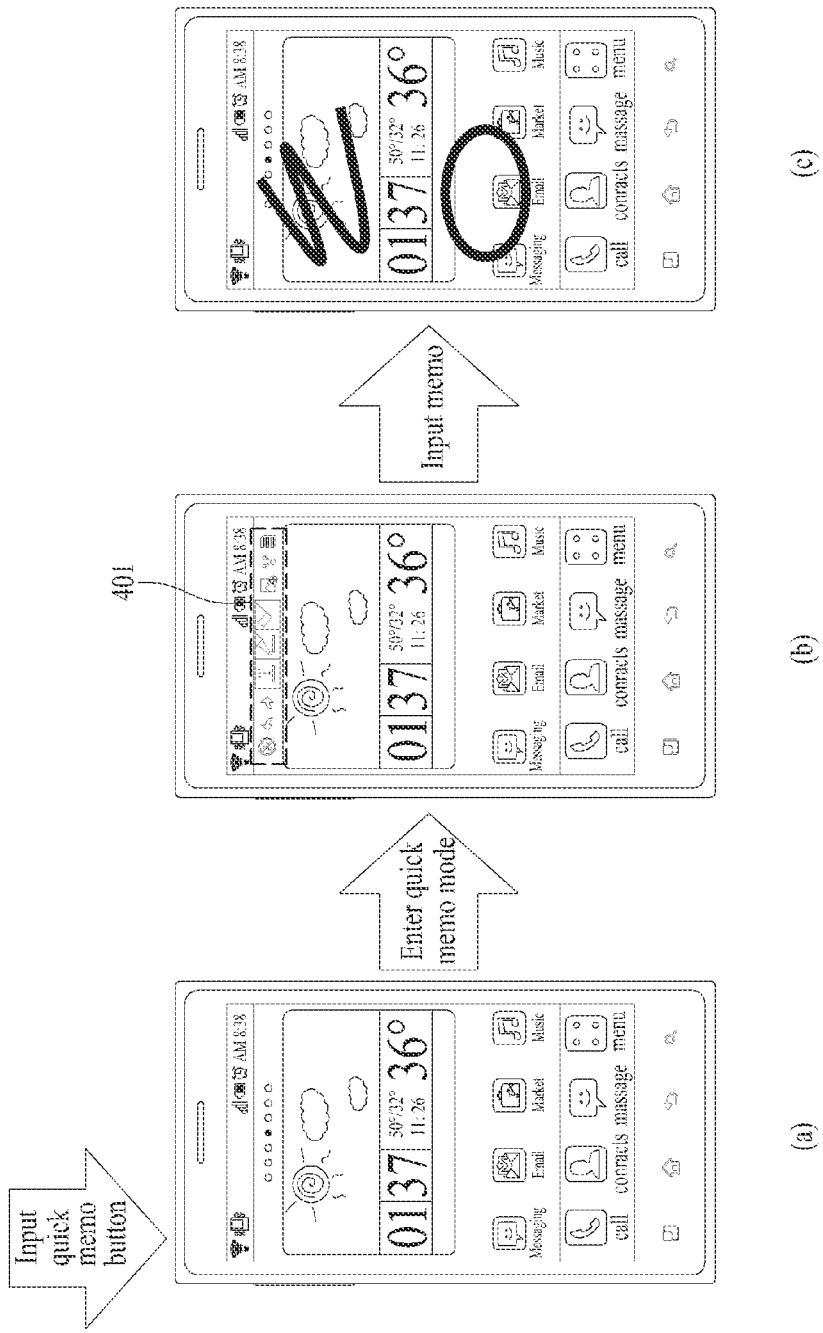

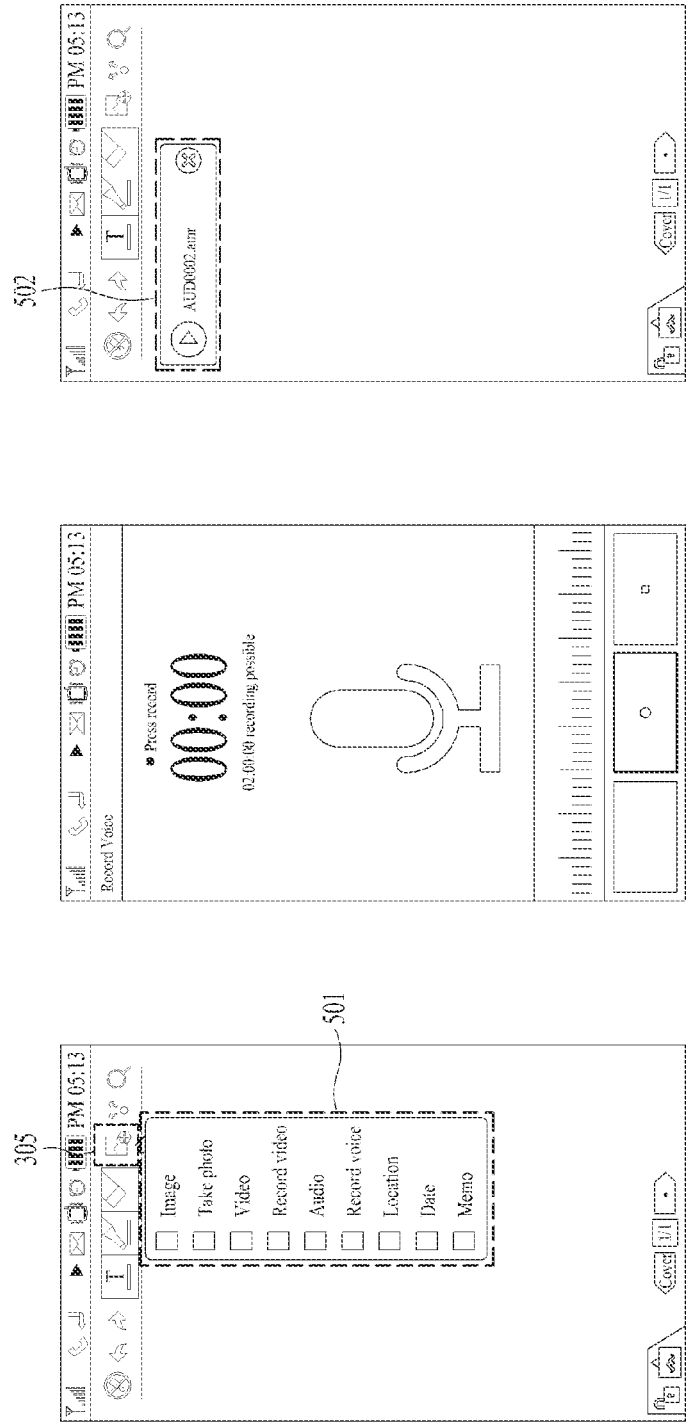

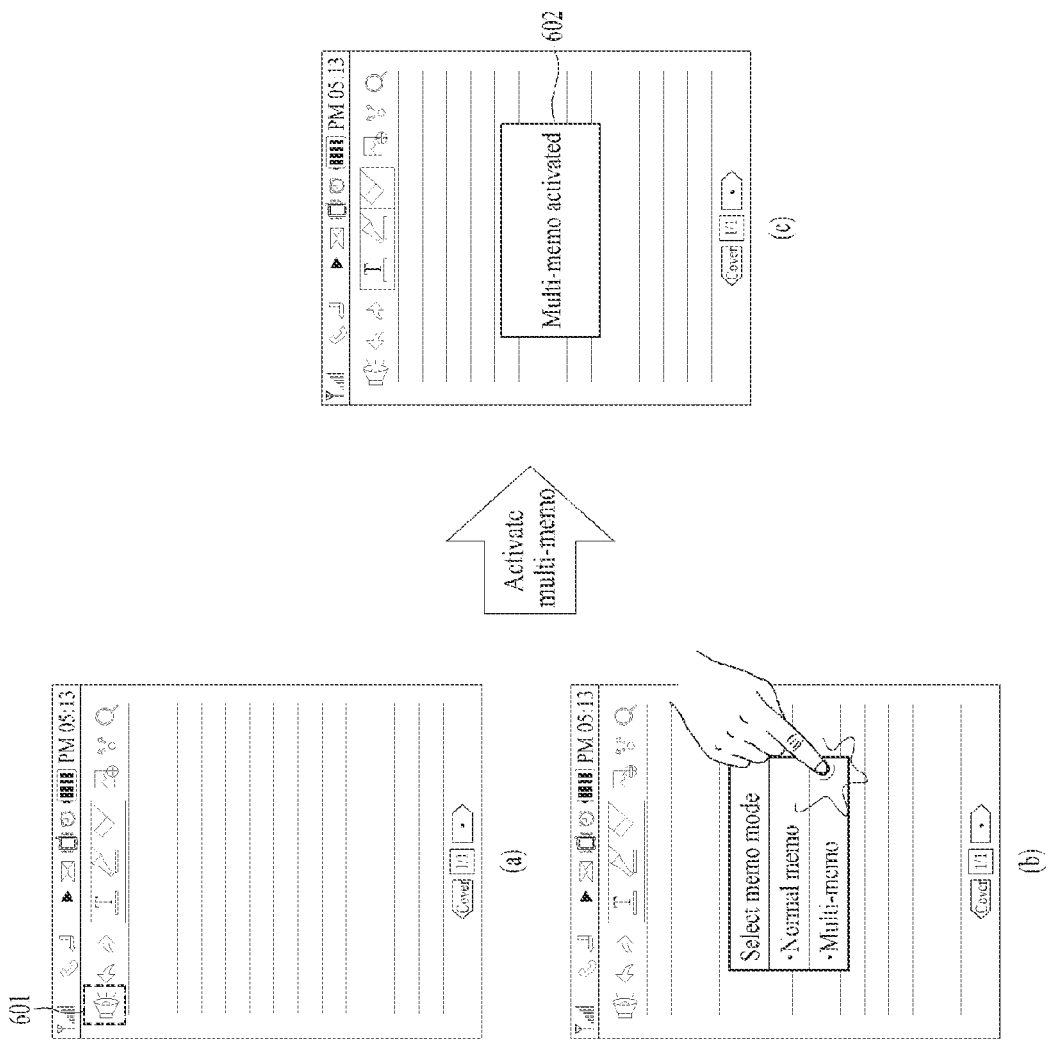

FIG. 7
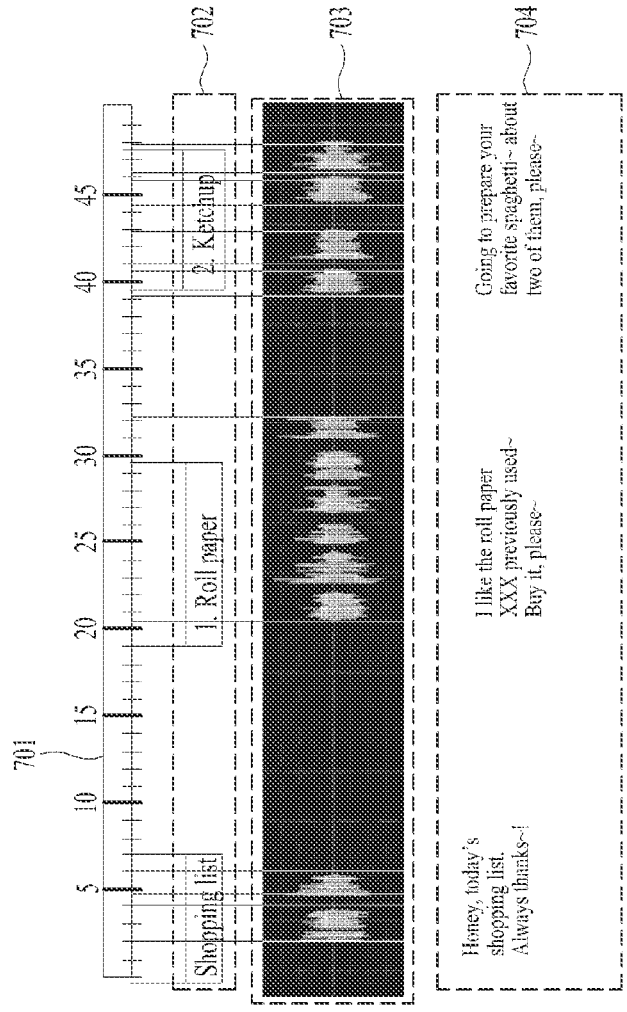
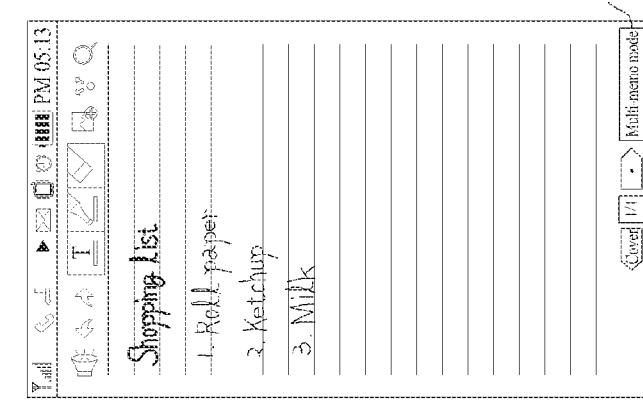

FIG. 14A
Material : 30 cm, 13 cm
Red or orange color round,
13 cm green-series round
balloon
(a)
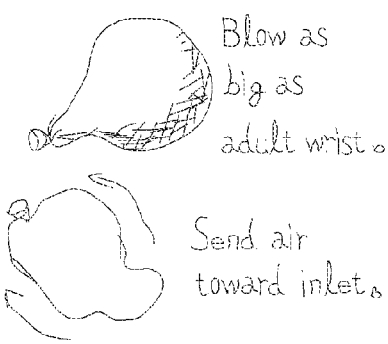
Blow as big as adult wrist.
Send air toward inlet.
(b)
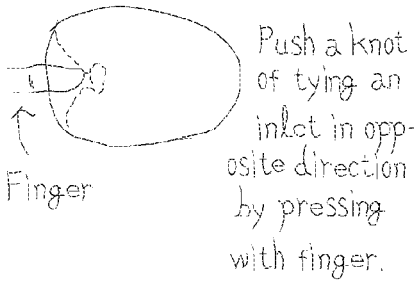
Finger
Push a knot of tying an inlet in opposite direction by pressing with finger.
(c)
Tying with two-round winding on red balloon knot.
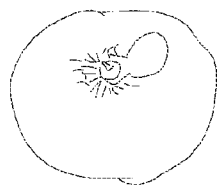
End!!
(d)

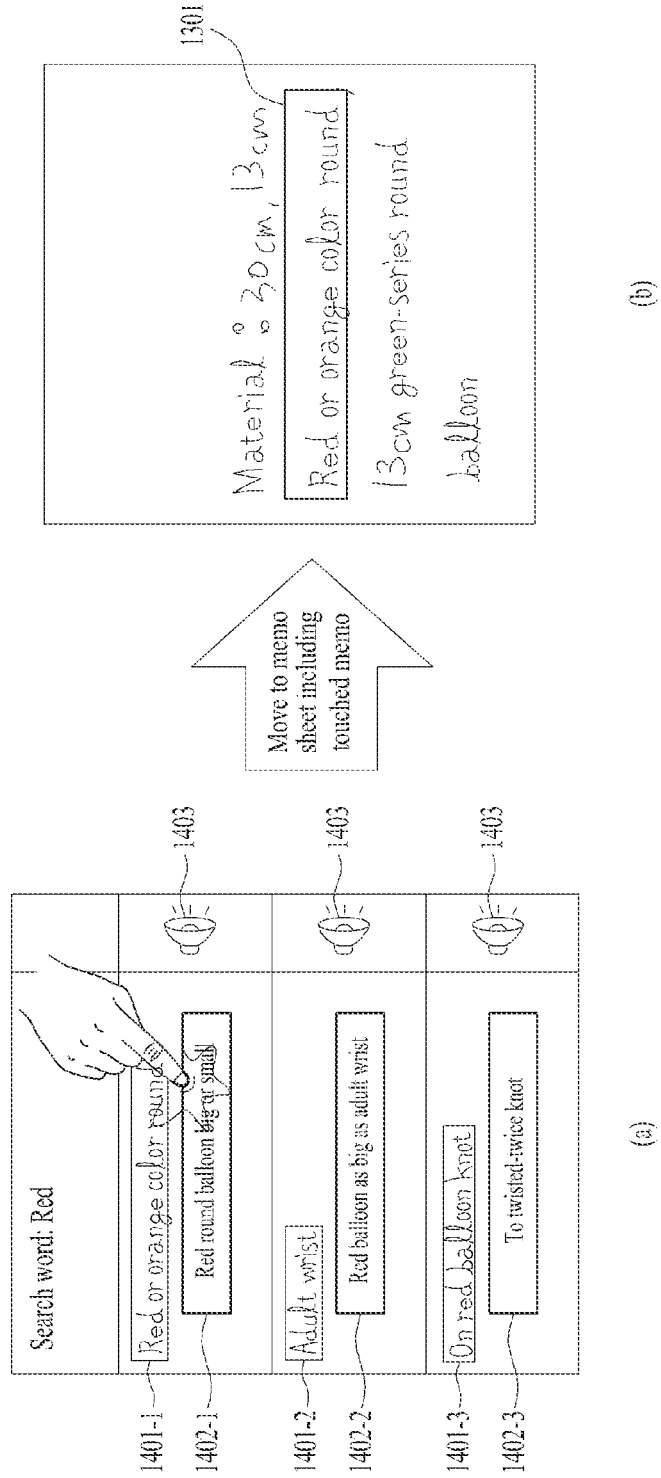

MOBILE TERMINAL AND CONTROLLING METHOD THEREOF

CROSS REFERENCE TO RELATED APPLICATIONS

Pursuant to 35 U.S.C. §119(a), this application claims the benefit of earlier filing date and right of priority to Korean Application No. 10-2012-0104944, filed on Sep. 21, 2012, the contents of which are all hereby incorporated by reference herein in its entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, in utilizing a memo function of a mobile terminal, various kinds of contents including photos, audio, video and the like can be saved together as well as a text memo. In order to facilitate the reading of a memo in which various kinds of the contents are combined together, many efforts need to be made to research and develop a method of arranging and saving the contents efficiently.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which an audio content can be played in consideration of user's convenience in reading a memo including the video content using a memo function of the mobile terminal.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen, an audio input unit, an audio output unit, a memory unit configured to store a first memo sheet including at least one memo object and at least one audio memo object for the first memo sheet, and a controller controlling the first memo sheet to be displayed on the touchscreen, the controller, when a prescribed memo object is selected from the at least one memo object displayed on the first memo sheet, controlling an audio memo object corresponding to the selected memo object to be outputted via the audio output unit.

In another aspect of the present invention, a method of controlling a mobile terminal according to the present invention may include the steps of saving a first memo sheet including at least one memo object and at least one audio memo object for the first memo sheet, displaying the first memo sheet to be displayed on a touchscreen, and when a prescribed memo object is selected from the at least one memo object displayed on the first memo sheet, controlling an audio memo object corresponding to the selected memo object to be outputted via an audio output unit.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 1 is a block diagram of a mobile terminal according to one embodiment of the present invention;

FIG. 3 is a diagram for one example of a state diagram of an application memo mode by a general method;

FIG. 4 is a diagram for one example of a state diagram of a quick memo mode by a general method;

FIG. 5 is a state diagram for a method of recording a voice in a memo sheet by a general method;

FIG. 6 is a diagram for examples of entering a multi-memo mode according to one embodiment of the present invention;

FIG. 7 is a diagram for one example of a method of creating a multi-memo synchronized with a voice according to one embodiment of the present invention;

FIG. 14A and FIG. 14B are diagrams for one example of a method of searching objects according to one embodiment of the present invention;

FIG. 15 is a diagram for one example of a state diagram of displaying a list of memo object including a search word according to one embodiment of the present invention.

DETAILED DESCRIPTION OF THE INVENTION

Figure 2A:
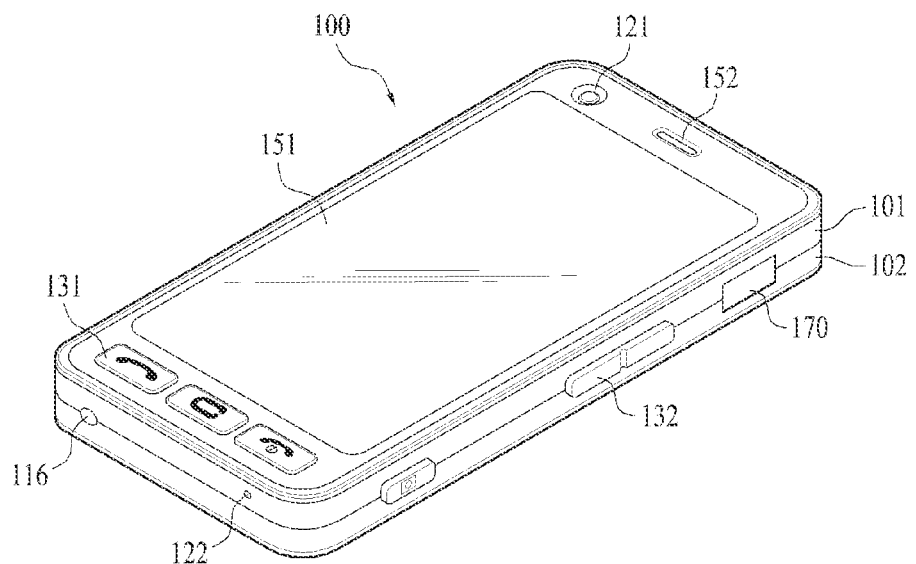
FIG. 2A is a front perspective diagram of a mobile terminal according to one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
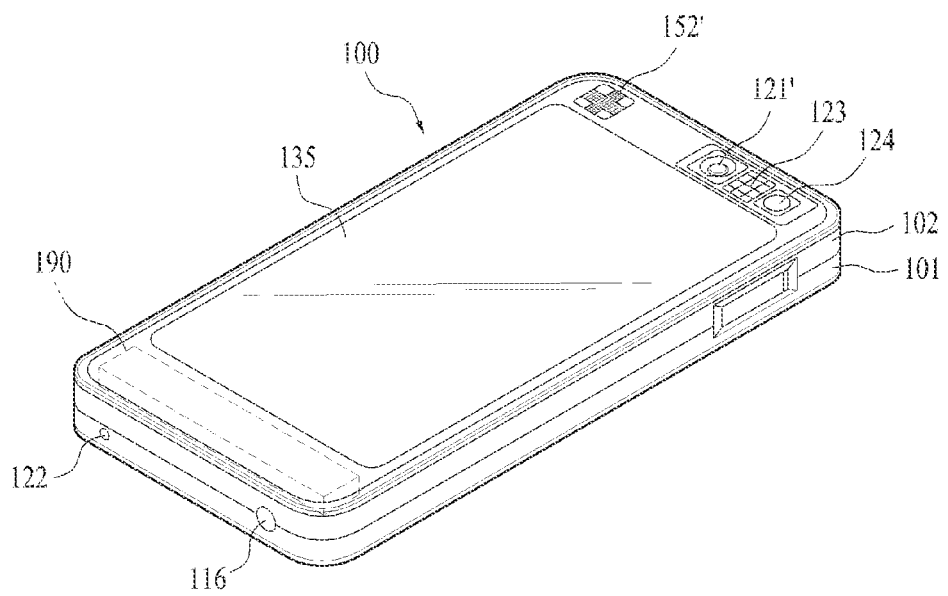
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, embodiments related to a control method, which can be implemented in the above-configured mobile terminal, shall be explained with reference to the accompanying drawings.

First of all, the mobile terminal 100 can support various memo modes or functions in order to meet various kinds of user's demands.

Regarding a function of memo, for example, the mobile terminal 100 can support a multimedia memo capable of saving a photo, a video, a voice recording and the like together as well as simply saving a memo using a text.

Regarding a mode of memo, for example, memo modes can be classified into an application memo mode for saving a memo by activating a memo application and a quick memo mode for creating a memo in any state of the mobile terminal 100. Differences between the two modes shall be described with reference to FIG. 3 and FIG. 4 as follows.

FIG. 3 is a diagram for one example of a state diagram of an application memo mode by a general method.

FIG. 3 (*a*) shows one example of a state diagram of activating a memo application of the mobile terminal 100. As observed from FIG. 3 (*a*), if a memo application is activated, the controller 180 can output icons 301-1 to 301-4 of at least one or more notebooks to the display unit 151. In this case, a notebook is a set of at least one or more memo sheets and includes a tool for collectively managing a plurality of memo sheets. And, the memo sheet means a blank virtual paper (sheet) provided for a user to take a memo or a memo written paper (sheet).

Referring to FIG. 3 (*a*), although 4 notebook icons 301-1 to 301-4 are being outputted, a user can create a new notebook in addition to the outputted notebooks. To this end, the controller 180 can output an icon (hereinafter named a new notebook icon) 302 for creating a new notebook to the display unit 151. In response to an input performed in a manner that a user touches the new notebook icon 302, as shown in FIG. 3 (*b*), the controller 180 can output a new notebook icon 301-5.

In case that the user intends to add a new content to the created new notebook or the previous notebook, edit a content of the created new notebook or the previous notebook, or delete a content from the created new notebook or the previous notebook, the user touches the notebook icon 301 to enter a screen for editing a notebook. For instance, if the controller 180 detects an input of a touch to the new notebook icon 301-5 [FIG. 3 (*b*)], the controller 180 can provide a screen for editing a new notebook in response to the detected input [FIG. 3 (*c*)].

The state diagram shown in FIG. 3 (*c*) is a generally provided notebook edit screen and icons or function unnecessary for the description of the present invention shall be omitted from the following description.

The notebook edit screen shown in FIG. 3 (*c*) outputs one of memo sheets included in the corresponding notebook. In this case, the outputted memo sheet may include a memo sheet situated in the first place of the notebook or a most recently edited memo sheet. A reference number '304' may include the number of memo sheets contained in a currently edited notebook and a page number of a currently edited memo sheet. For instance, '4/7' denoted by the reference number 304 may indicate that the total number of the memo sheets contained in the notebook is 7 and that the page number of the currently edited memo sheet is 4.

For a shift between memo sheets, the controller 180 can output navigation icons 303-1 and 303-2. Hence, in order to go to a memo sheet ahead of a currently edited memo sheet, the user can touch the left navigation icon 303-1. On the contrary, in order to go to a memo sheet behind a currently edited memo sheet, the user can touch the right navigation icon 303-2.

A content can be inputted to a memo sheet in various ways. For instance, when a user inputs a memo to a memo sheet, the user can input the memo in a handwriting style 306 using such a pointer as a finger, a touch pen and the like. In the following description, an object inputted in the handwriting style 306 shall be named a handwritten memo object. For another instance, when a user inputs a memo to a memo sheet, the user can input the memo in a text style 307 using a virtual keypad (or a keyboard capable of communicating with the mobile terminal 100). In the following description, an object inputted in the text style 307 shall be named a typed memo object.

Regarding the memo function mentioned in the foregoing description, a photo, a video, a voice recording and the like can be included together in a memo sheet. If a user touches a content attach icon 305 included in the memo sheet, the user can receive an output of a list of contents which can be included in the memo sheet. If the user selects one of the contents from the list, the corresponding content can be attached to the memo sheet. Meanwhile, since an embodiment of the present invention is related to a voice recording content attachable to a memo sheet, a method of attaching a voice recording content is described with reference to FIG. 5 as follows. Attachments of the rest of the contents shall not be explained in the following description for clarity of the specification.

As mentioned in the foregoing description with reference to FIG. 3, in case of attempting to take a memo generally using a memo application (application memo mode), it is able to efficiently manage a memo sheet by a method of managing a notebook.

Besides the above-mentioned application memo mode, the mobile terminal 100 can support a quick memo mode. In the following description, the quick memo mode shall be explained with reference to FIG. 4. In the quick memo mode, when a memo sheet is created, a blank virtual memo paper is not created but an image of capturing a screen of the mobile terminal 100 is utilized as a memo sheet.

FIG. 4 is a diagram for one example of a state diagram of a quick memo mode by a general method. FIG. 4 (*a*) is a state diagram of a home screen of the mobile terminal 100. In this state, in order to enter a quick memo mode, a user can input a touch to a quick memo button. In this case, the quick memo button can be provided as hardware to the mobile terminal 100. Alternatively, if the quick memo button is provided as an icon to a screen of the mobile terminal 100, an input can be applied by pressing the quick memo button through the touchscreen. Alternatively, if a preset touch action is performed on the touchscreen, a quick memo mode can be entered.

FIG. 4 (*b*) a diagram of a state that a quick memo mode is entered. Referring to FIG. 4 (*b*), the controller 180 uses an image of capturing the home screen state shown in FIG. 4 (*a*) as a memo sheet and outputs a memo menu 401 for inputting a memo. Moreover, besides the home screen, in the quick memo mode, the controller 180 can utilize any screen (e.g., a menu screen, a prescribed active application screen, etc.), which is displayed at the moment of inputting a user command for entering a quick memo mode, as a memo sheet.

A user takes a memo (e.g., a handwritten memo object) on the memo sheet including the capture image shown in FIG. 4 (*b*) [FIG. 4 (*c*)] and the memo sheet including the corresponding memo can be then saved.

So far, the application memo mode and the quick memo mode are described with reference to FIG. 3 and FIG. 4. In the following description, although the following embodiments of the present invention may be described by referring to one of the application memo mode and the quick memo mode, it is apparent that the embodiments of the present invention are applicable to both of the two modes.

As mentioned in the foregoing description, each of the application memo mode and the quick memo mode supports multimedia memos. In particular, a memo including a voice recording among the multimedia memos shall be described with reference to FIG. 5 as follows.

FIG. 5 is a state diagram for a method of recording a voice in a memo sheet by a general method.

FIG. 5 (*a*) is a state diagram of a screen including a memo sheet outputted in application memo mode. Referring to FIG. 5 (*a*), the controller 180 can output a list 501 for selecting a type of a content, which is to be attached, in response to a touch input to a content attach icon 305. If a voice recording is selected from the list 501, the controller 180 can output a state diagram for receiving an input of a voice [FIG. 5 (*b*)].

FIG. 5 (*c*) is a diagram to show a state that a voice recording content is attached to a memo sheet. Referring to FIG. 5 (*c*), the controller 180 is outputting a voice content icon 502 to one portion of a memo sheet.

In order to play the voice content included in the memo sheet, a user of the mobile terminal 100 can touch the voice content icon 502. In particular, the controller 180 can output the voice content through the audio output module 152 in response to an input of the touch to the voice content icon 502.

The above-mentioned general method is advantageous in that a voice memo can be included in a memo sheet but is disadvantageous in having difficulty in accessing a playback of the voice memo. This is because a user is unable to search for and play a specific section of a memo if a voice recording is performed during a considerably long time. In order to obviate one or more problems due to limitations and disadvantages of the related art, a method of accessing fragments of a voice recording effectively in a manner of dividing sections of the voice recording by prescribed rules and then linking the fragments of the divided voice recording to other memos according to one embodiment of the present invention is described as follows.

First of all, in the following description, a voice recording content attached in the manner mentioned in the foregoing description is named an audio memo object and the rest of memo contents except the audio memo object are named memo objects. The memo objects include the handwritten memo object and the typed memo object mentioned in the foregoing description and may also include a video memo object including a photo and a video.

[Method of Entering a Multi-Memo Mode]

A method of entering a mode for taking a memo synchronized with voice according to an embodiment of the present invention is explained with reference to FIG. 6 as follows. In the following description, a mode for taking a memo synchronized with voice is named a multi-memo mode and a mode for taking a memo unsynchronized with voice is named a normal memo mode.

FIG. 6 is a diagram for examples of entering a multi-memo mode according to one embodiment of the present invention.

FIG. 6 (*a*) is a diagram to show a state that a memo application is active. Referring to FIG. 6 (*a*), an icon (hereinafter named a multi-memo icon) 601 for entering a mode for taking a voice synched memo is displayed in the state diagram.

According to one embodiment of the present invention, in order to enter a multi-memo mode, a user can touch the multi-memo icon 601. Alternatively, if a voice 'multi-memo start' is recognized by utilizing voice recognition, the controller 180 can activate the multi-memo mode. Alternatively, if a user taps a atrial region of the terminal using a touch pen or finger or a handwriting/typing starts to be inputted, the controller 180 can automatically activate the multi-memo mode. Alternatively, if a user inputs a specific gesture, the controller 180 can activate the multi-memo mode. In this case, the specific gesture may include a specific touch input as a predefined action or an action of swiping a palm at a front side of the mobile terminal 100 without contacting with the mobile terminal 100. Alternatively, if an input of a button provided to a touch pen capable of communicating with the mobile terminal is applied, the controller 180 can activate the multi-memo mode.

For another example of a method according to an embodiment of the present invention, referring to FIG. 6 (*b*), when a memo application is activated, whether to activate a normal memo mode or a multi-memo mode is selected and the multi-memo mode can be then entered.

In case that the multi-memo mode is activated, the controller 180 can output a guide text 602, which indicates that the multi-memo mode has been activated, via the display unit 151 [FIG. 6 (*c*)]. In case that the microphone 122 is deactivated, the controller 180 can control the microphone 122 to be automatically activated from the timing point of activating the multi-memo mode.

Meanwhile, according to an embodiment of the present invention, the multi-memo mode can be entered when a memo starts to be taken. Moreover, the multi-memo mode can be also entered by a user's prescribed input in the course of taking a memo in a normal memo mode. For instance, while a memo is being taken in a normal memo mode, the multi-memo mode can be entered in response to a touch input to a multi-memo icon.

The controller 180 can set the timing point of activating the microphone 122 to a timing point of entering a multi-memo mode. Yet, the microphone 122 can be activated in a normal memo mode as well. Audio data recorded in the normal memo mode is saved as a preliminary audio memo object. Utilization of the preliminary audio memo object shall be described in detail with reference to FIG. 11 and FIG. 13 later.

[Notebook Naming]

As mentioned in the foregoing description with reference to FIG. 3, a notebook is a set of memo sheets. When a notebook is created, the mobile terminal 100 can receive an input of a name for the created notebook from a user. And, the mobile terminal 100 can enable a user to edit a name of a notebook while the notebook is being used.

According to an embodiment of the present invention, a method for the controller 180 to automatically receive a designation of a notebook name from a memo object is proposed.

According to an embodiment of the present invention, the controller 180 can designate at least one of a first word of a first memo object in a memo sheet of a notebook, a most frequently used word in a memo sheet, a first word of an audio memo object, a most frequently used word in an audio memo object and a most frequently used word in a memo object and an audio memo object as a name of the memo sheet or a name of the notebook. In case of the audio memo object, a first word and/or a most frequently used word can be obtained through Speak to Text (STT).

[Method of Taking a Memo in Multi-Memo Mode and a Link of an Audio Memo Object]

In the following description, a method of taking a memo synchronized with a voice according to an embodiment of the present invention is explained with reference to FIG. 7. In particular, a method of linking a memo object and a voice object to each other is described as follows.

FIG. 7 is a diagram for one example of a method of creating a multi-memo synchronized with a voice according to one embodiment of the present invention. FIG. 7 (a) is a state diagram in multi-memo mode. In this multi-memo mode, a guide text 705 or indicator indicating a mode of a memo can be outputted.

The multi-memo shown in FIG. 7 is described on the assumption that a memo for a wife to ask a husband for shopping is taken. The wife can take and save a multi-memo using the mobile terminal 100 of her own. The husband reads a memo application of the mobile terminal 100 of the wife or can read memo data received from the wife using a memo application of the mobile terminal 100 of his own.

According to one embodiment of the present invention, memo objects inputted by a user can be discriminated into various objects with reference to the continuity of the corresponding inputs. For instance, in order to input a handwritten memo object shown in FIG. 7 (a), a user consecutively inputs 'Shopping list'. In order to input '1. Roll paper' in addition, an input position of a memo is changed. As the input position of the memo is changed, the input of the memo may pause. In this case, since the continuity of the memo object input can be regarded as temporarily cut, the controller 180 discriminates 'Shopping list' and '1. Roll paper' from each other and recognizes them as different handwritten memo objects, respectively. In the following description, assume that handwritten memo objects are discriminated from each other with reference to the continuity of the corresponding inputs.

Referring to FIG. 7 (a), '1. Roll paper', '2. Ketchup' and '3. Milk' are saved as handwritten memo objects for the list to be bought under the title 'Shopping list'. For clarity of the following description, 'Shopping list', '1. Roll paper', '2. Ketchup' and '3. Milk' shall be named 'first handwritten memo object', 'second handwritten memo object', 'third handwritten memo object' and 'fourth handwritten memo object', respectively.

As the microphone 122 is active in the multi-memo mode, the wife, who is a user of the mobile terminal 100, can save a voice memo, i.e., an audio memo object, to the husband together with the multi-memo while taking the multi-memo shown in FIG. 7.

FIG. 7 (b) is a diagram of a time for taking a memo and a time for recording an audio memo object on a time axis. FIG. 7 (b) has nothing to do with the state diagram of the mobile terminal 100 but is provided to facilitate the description of the multi-memo mode.

Referring to FIG. 7 (b), a time axis 701 for taking a memo is shown. And, a time for creating each handwritten memo object 702 is shown to correspond to the time axis 701. In particular, since the second handwritten memo object is shown in a time interval between 19 seconds and 30 seconds on the time axis 701, it can be observed that the second handwritten memo object is created in the time interval between 19 seconds and 30 seconds from the timing point of starting to take the multi-memo.

A voice waveform of the audio memo object saved together is denoted by a reference number 703. And, a content of the audio memo object is denoted by a reference number 704.

The voice waveform is saved at the same position of the handwritten memo object to correspond to the time of actually recording the audio memo object on the time axis 701. For instance, an interval of generating a first waveform in the audio memo object approximately lies between 2 second and 6 seconds since the start of the multi-memo.

According to an embodiment of the present invention, if a discontinuous part of an audio waveform exists in an audio memo object recorded for a prescribed time period (e.g., 0 to 50 seconds), the controller 180 can divide the audio memo object into several regions with reference to the discontinuous part. For instance, the audio memo object denoted by the reference number 703 is the object recorded for the prescribed time period, it can be divided into 3 audio memo objects with reference to the discontinuity of the audio waveforms. In particular, a first object may lie between 2 seconds and 6 seconds, a second object may lie between 20 seconds and 32 seconds, and a third object may lie between 39 seconds and 47 seconds. For clarity of the following description, the first object, the second object and the third object shall be named a first audio memo object, a second audio memo object and a third audio memo object, respectively.

The controller 180 links each of the first to third audio memo objects to another memo object based on a time interval for which the corresponding audio memo object is recorded.

In particular, a memo object contains a created time information corresponding to a time interval for which the memo object is inputted. And, an audio memo object contains a created time information corresponding to a time interval for which the audio memo object is recorded. According to an embodiment of the present invention, the controller 180 links a memo object, which has an input time interval closest to a recording time interval of an audio memo object, to the corresponding audio memo object.

For instance, since the recording time interval of the first audio memo object approximately lies between 2 seconds and 6 seconds and the input time interval of the first handwritten memo object lies between 0 second and 7 seconds, the recording time interval of the first audio memo object and the input time interval of the first handwritten memo object are closest to each other. Hence, the controller 180 can link the first handwritten memo object and the first audio memo object to each other. Using the similar method, the controller 180 can link the second handwritten memo object and the second audio memo object to each other. And, the controller 180 can link the third handwritten memo object and the third audio memo object to each other.

According to another embodiment of the present invention, the controller 180 can match a memo object to an audio memo object having a created time information within a preset time range from a created time information of the memo object.

Meanwhile, the number of memo objects and the number of audio memo objects may not be equal to each other. In particular, the number of audio memo objects may be equal to or smaller than that of memo objects. For instance, referring to FIG. 7 (*a*), 4 handwritten objects and 3 audio memo objects are present. Hence, the number of the audio memo objects may be smaller than that of the handwritten memo objects.

The inputted audio memo objects shown in FIG. 7 may be saved in the memory 160 in a manner of being included in the memo sheet shown in FIG. 7 (*a*) or linked to a corresponding memo objects separately from the memo sheet.

In this case, 'linked' means that at least one of the memo objects/audio memo objects is set to correspond to one of the audio memo objects/memo objects in a manner of saving object identification information on the corresponding audio memo object/memo object.

So far, in the above description, a method of taking a multi-memo and a method of linking memo objects and audio memo objects included in the multi-memo to each other are explained. In case of reading a memo sheet saved in the above manner, a method of playing a linked audio memo object is described with reference to FIG. 8 as follows.

[Partial Play Mode]

Figure 8:
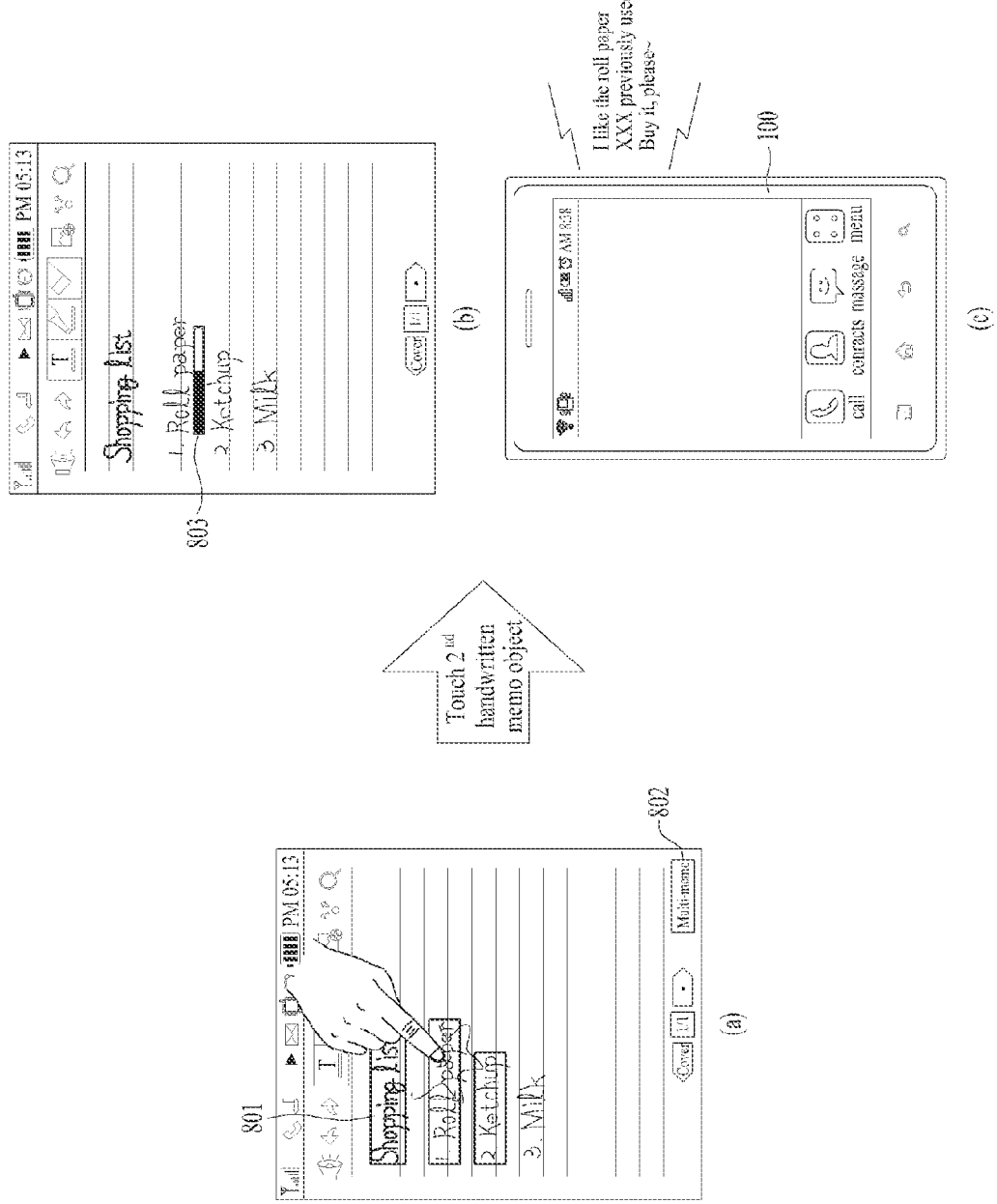
FIG. 8 is a diagram for one example of a method of reading a memo object and a method of playing a linked audio memo object.

FIG. 8 is a diagram for one example of a method of reading a memo object and a method of playing a linked audio memo object. FIG. 8 (*a*) is a state diagram of the mobile terminal 100 in the course of reading a multi-memo.

Referring to FIG. 8 (*a*), a text 802 or indicator, which indicates that a currently read memo is a multi-memo, can be outputted.

A memo having an audio memo object linked thereto can be outputted in a manner of being discriminated from another memo object having an audio memo object not linked thereto. In particular, the controller 180 can output an indicator 802 indicating that the memo object is linked to the corresponding audio memo object. Hence, for example shown in FIG. 8 (*a*), it can be observed that first to third handwritten memo objects are linked to audio memo objects, respectively. And, it can be also observed that a fourth handwritten object is not linked to an audio memo object.

According to an embodiment of the present invention, in case that a touch input is applied to a memo object having an audio memo object linked thereto, the controller 180 can play the audio memo object linked to the touched memo object in response to the touch input.

FIG. 8 (*b*) is a state diagram in case that the second handwritten memo object is touched. And, FIG. 8 (*c*) is a state diagram of the mobile terminal 100.

Referring to FIG. 8 (*b*) and FIG. 8 (*c*), the second audio memo object linked to the second handwritten memo object is currently outputted via the audio output module 152. In doing so, a progressive bar 803 related to the second audio memo object can be additionally outputted together with the output of the audio memo object. In particular, the progressive bar 803 can be outputted in order to indicate that the currently played audio memo object is related to which memo object.

The controller 180 can control a length of the progressive bar 803 to be set proportional to a play time of the second audio memo object. Alternatively, the controller 180 may control the length of the progressive bar 803 to be set proportional to a length of the second handwritten memo object itself linked to the second audio memo object irrespective of the play time.

Moreover, it is apparent that a progressive extent within the progressive bar 803 can be changed depending on a played time of the second audio memo object.

Referring to FIG. 8 (*c*), as the second handwritten memo object is touched, the second audio memo object linked to the second handwritten memo object is currently outputted via the audio output module 152. After completion of the output, the mobile terminal 100 can go back to the state shown in FIG. 8 (*a*).

According to another embodiment of the present invention, if a specific memo object is touched, the controller 180 may not output an audio memo object linked to the specific memo object only. For instance, if the controller 180 detects an input of a touch to a specific memo object, it can play a prescribed number of audio memo objects after the audio memo object linked to the specific memo object together with the audio memo object linked to the specific memo object in response to the detected input.

According to another embodiment of the present invention, if the controller 180 detects an input of a touch to a specific memo object, it can play audio memo objects recorded for a prescribed time together by starting with the audio memo object related to the touched memo object in response to the detected input. For instance, if the second handwritten memo object is touched in FIG. 8, the controller 180 can output the audio data recorded for 10 seconds with reference to a play start time of the second audio memo object in response to the touch.

According to another embodiment of the present invention, if the controller 180 detects an input of a touch to a specific memo object, it can play audio data before or after a prescribed time from an audio playback of the touched specific memo object in response to the detected input. For instance, in case that an audio play section of the specific memo object lies between 10 seconds and 14 seconds, the controller 180 can play the audio data amounting to 8 to 16 seconds in a manner of playing the audio play section together with both 2 seconds prior to the audio play section and 2 seconds next to the audio play section.

Meanwhile, as mentioned in the foregoing description, it can be observed that audio data is not linked to the fourth handwritten memo object '3. Milk'. According to one embodiment of the present invention, the controller 180 can control a typed or handwritten memo object having no audio data linked thereto to be outputted in a manner of being converted to a voice or speech by TTS (text to speech).

For instance, if the fourth handwritten memo object is touched in FIG. 8 (*a*), the controller 180 converts the fourth handwritten memo object to a voice or speech by TTS and is then able to output the corresponding voice or speech via the audio output module 152.

[Play-all Mode]

So far, the method of partially playing the audio data saved together with the multi-memo is described. Furthermore, a method of playing the whole audio data at a time according to an embodiment of the present invention is proposed. In the following description, a method of playing an audio memo object collectively is explained with reference to FIGS. 9 to 13.

Figure 9:
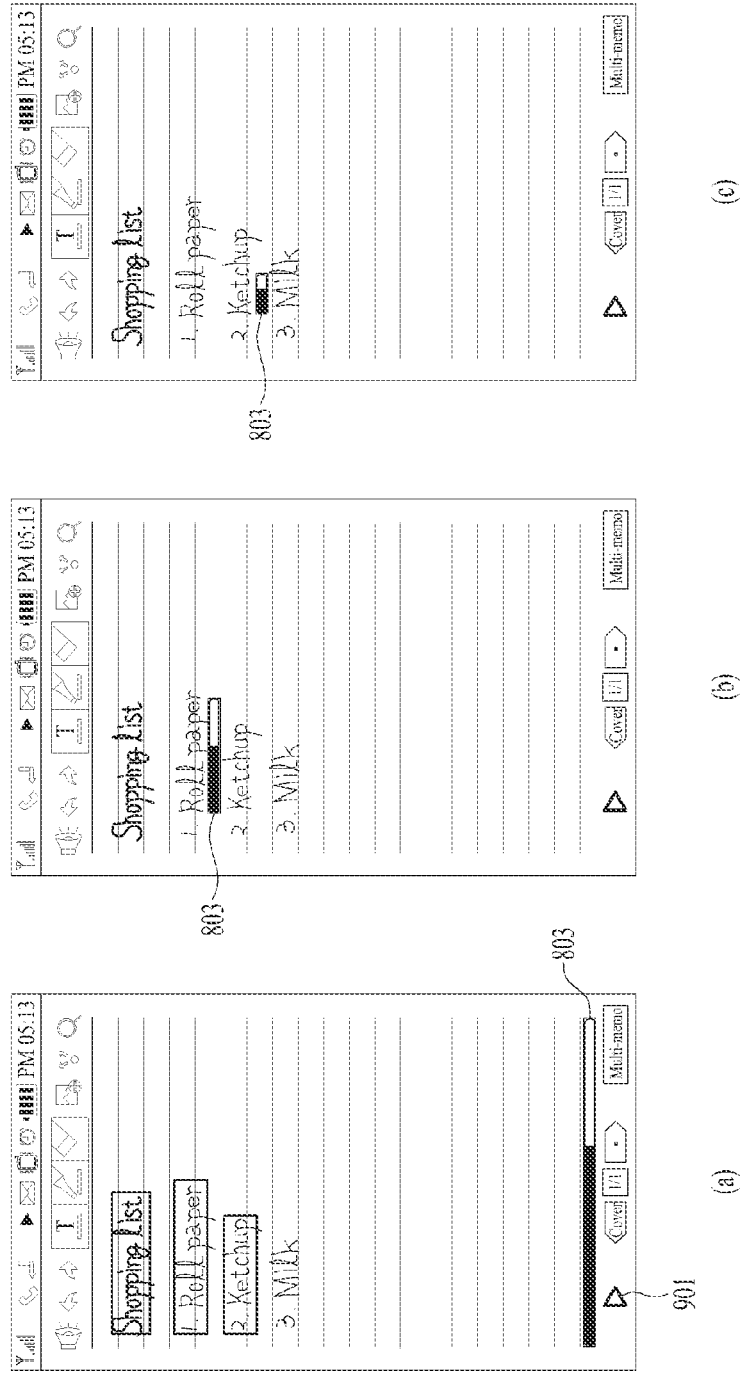
FIG. 9 is a diagram for a state diagram of reading a multi-memo according to one embodiment of the present invention.

FIG. 9 is a diagram for a state diagram of reading a multi-memo according to one embodiment of the present invention.

Referring to FIG. 9 (*a*), the controller 180 is outputting an icon (hereinafter named a play icon) 901 for playing audio data of a multi-memo.

If the controller 180 detects an input of a touch to the play icon 901, it can play a whole saved audio memo object in response to the detected input. When the controller 180 plays the audio memo object, it can play the audio memo object divided into several fragments in order of saving the fragments. Alternatively, if the controller 180 detects an input of a touch to the play icon 901, the controller 180 can play the whole audio data not divided into several fragments. While the controller 180 plays the whole audio memo object, it can also output a progressive bar 803 for play-all.

FIG. 9 (b) is a diagram of a state in which play-all is performed by a method according to an embodiment of the present invention.

Referring to FIG. 9 (b), the controller 180 can control a currently played audio memo object and a memo object corresponding to the currently played audio memo object to be visually discriminated from each other. For instance, while the second audio memo object is being played, the controller 180 can output a progressive bar 803 in order for the second handwritten memo object linked to the second audio memo object to be discriminated from other handwritten memo objects. After completion of the playback of the second audio memo object, the controller 180 can play the third audio memo object in continuation with the second audio memo object. In doing so, the controller 180 controls the progressive bar 803 corresponding to the second audio memo object to disappear and also controls a progressive 803 to be outputted together with the third handwritten memo object '2. Ketchup' linked to the third audio memo object. Subsequently, the controller 180 continues to play the rest of the audio memo objects including the audio memo object corresponding to the last memo object.

The detailed description of the progressive bar 803 is the same as described with reference to FIG. 8 and will be omitted from the following description.

Meanwhile, when a memo object corresponding to a currently played audio memo object is visually discriminated, the controller 180 can output an indicator of a different type indicating that the audio memo object is currently played aside from the progressive bar 803. For instance, the controller 180 can control the memo object corresponding to the currently played audio memo object to blink.

Meanwhile, according to an embodiment of the present invention, the controller 180 can determine a play sequence of audio memo objects in order for at least one or more audio memo objects to be sequentially outputted in a specific arrangement sequence of memo objects corresponding to the at least one or more audio memo objects. In the following description, a method of determining a play sequence of an audio memo object is explained with reference to FIG. 10.

Figure 10:
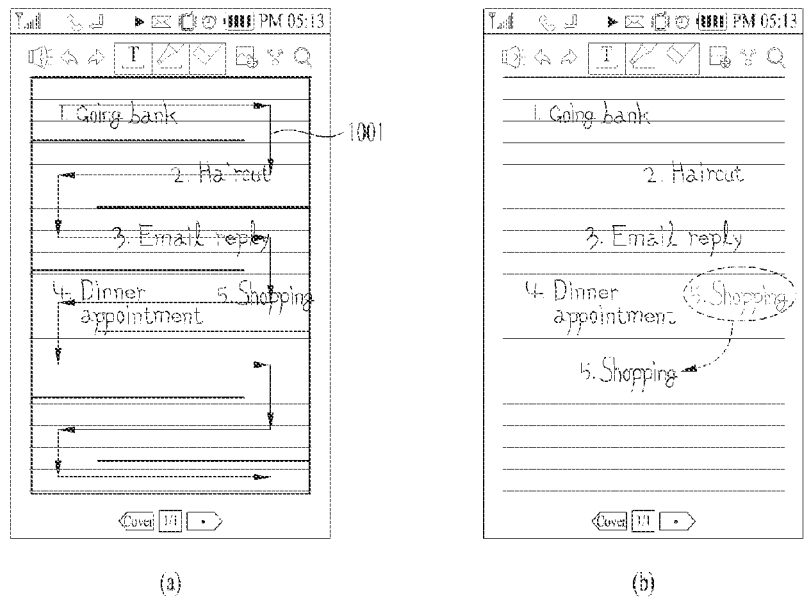
FIG. 10 is a diagram for a method of determining a play sequence of an audio memo object according to another embodiment of the present invention.

FIG. 10 is a diagram for a method of determining a play sequence of an audio memo object according to another embodiment of the present invention.

Referring to FIG. 10 (a), a memo is currently read. And, an arrow for determining a play sequence is displayed. When a sequence for playing audio memo objects is determined, the controller 180 can determine a play sequence of each audio memo object in accordance with a relative location of a corresponding memo object existing on a path of the arrow. For example shown in FIG. 10 (a), a sequence of handwritten memo objects on the arrow path includes '1. Going bank', '2. Haircut', '3. Email reply', '5. Shopping' and '4. Dinner appointment' in order. Hence, the controller 180 can determine the play sequence of the audio memo objects to correspond to the sequence of the handwritten memo objects on the arrow path. For example of the arrow path, the controller 180 can determine the audio play sequence by another arrow path possible on a memo sheet as well as the former arrow path.

Meanwhile, as an arrangement sequence of the memo objects is changed, the controller 180 can control an output order of the at least one audio memo object to be changed. For instance, a location of the handwritten memo object '5. Shopping' can be changed by a user [FIG. 10 (b)]. For instance, the controller 180 can control a location of a desired memo object to be changed by a long-touch & drag input performed on the corresponding memo object.

Considering the changed location of the memo object shown in FIG. 10 (b), the controller 180 can determine that the order of the corresponding memo object has been changed on the arrow path. Hence, the controller 180 can play the audio memo objects in order of '1. Going bank', '2. Haircut', '3. Email reply', 4. Dinner appointment' and '5. Shopping' to correspond to the locations of the changed memo object in determining the play sequence of the audio memo objects.

As mentioned in the foregoing description, a memo can be viewed while an audio memo object is being played. On the other hand, even if a memo list is currently outputted, it is able to play and audio memo object. To this end, a corresponding method is described with reference to FIG. 11 and FIG. 13 as follows.

Figure 11:
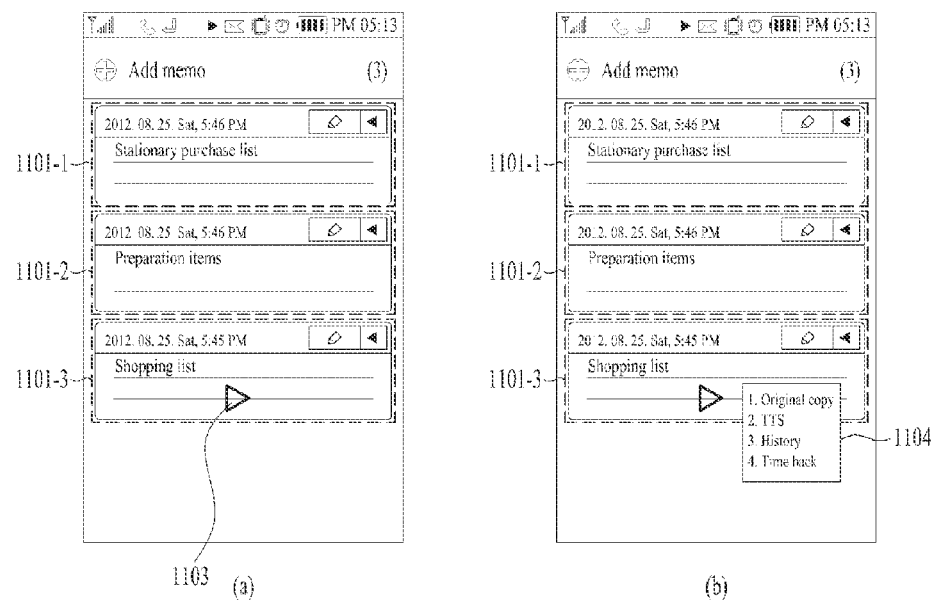
FIG. 11 is a diagram for one example of playing an audio memo object in a memo list state according to one embodiment of the present invention.

FIG. 11 is a diagram for one example of playing an audio memo object in a memo list state according to one embodiment of the present invention.

Referring to FIG. 11, according to an embodiment of the present invention, the controller 180 controls a plurality of saved memo sheets to be displayed on the touchscreen. If a prescribed memo sheet is selected from the memo sheet list, the controller 180 controls the selected memo sheet to be displayed on the touchscreen.

For instance, referring to FIG. 11 (a), a memo list created in quick memo mode is currently outputted by the controller 180. Hence, the currently outputted memos 1101-1 to 1101-3 indicate memos taken in the quick memo mode. If a prescribed memo is selected from the memos 1101-1 to 1101-3 by a user, the controller 180 can output the selected memo sheet to the touchscreen.

If the selected memo sheet corresponds to a multi-memo related to an audio memo object in the memo list, the controller 180 can control the multi-memo to be displayed in a manner of being discriminated from a normal memo that is not related to an audio memo object. For instance, if a saved memo is a multi-memo, the controller 180 can output an indicator 1103 indicating that the saved memo is the multi-memo in a playlist.

According to an embodiment of the present invention, the controller 180 can output a list (hereinafter named a play mode list) 1104 for selecting an audio play mode in response to an input of a touch to the indicator 1103 [FIG. 11 (b)].

The play mode list 1104 may include '1. Original copy', '2. TTS', '3. History' and '4. Time back' modes.

The '1. Original copy' play mode is a basic play mode and is identical to the play-all mode described with reference to FIG. 9. Hence, this play mode means that a saved audio memo objects is played in order of a saved time. When the audio memo object is played, as mentioned in the foregoing description, a progressive 803 can be outputted to a memo sheet together with the audio memo object.

The '2. TTS' play mode is a mode for playing a saved audio memo object in order in a manner similar to that of the basic play mode '1. Original copy'. Yet, in the '1. Original copy' play mode, if a memo object failing to be linked to an audio memo object exists, ay audio output for the memo object is not performed. On the other hand, in the '2. TTS' play mode, if a memo object failing to be lined to an audio memo object is a typed or handwritten memo object, the controller converts the corresponding memo object to a voice by TTS and then provides the corresponding voice together with other audio memo objects.

In doing so, the controller 180 may determine a play sequence of the audio memo objects and the corresponding voices in order of creations of memo objects linked to them. Alternatively, as shown in FIG. 10, the controller 180 may determine the play sequence of the audio memo objects and the corresponding voices depending on relative locations of the memo objects in the memo sheet.

In a method of playing a created memo sheet in FIG. 9 (*a*), if a corresponding playback is performed using the '2. TTS' play mode, the controller 180 can play audio memo objects linked to 'Shopping list', '1. Roll paper' and '2. Ketchup'. After the controller 180 has played the audio memo objects, the controller 180 can play a TTS converted voice for '3. Milk' failing to be linked to any audio memo object.

In the '3. History' play mode, the controller 180 controls at least one memo object to be sequentially displayed on the selected memo sheet in accordance with a created time of the corresponding object and also controls at least one audio memo object to be outputted in a manner of being synchronized with the corresponding memo object displayed on the selected memo sheet.

Figure 12:
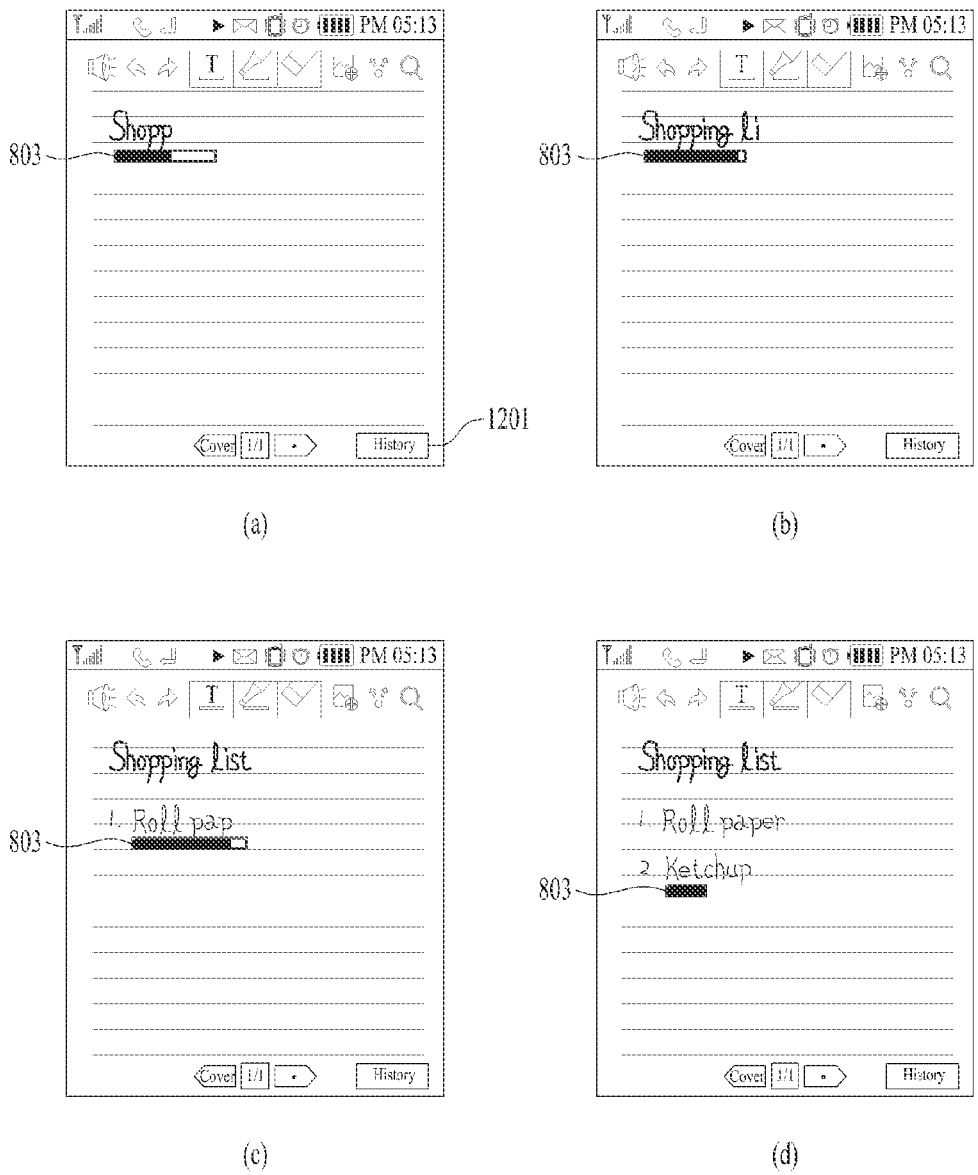
FIG. 12 is a state diagram to describe that each memo object is sequentially displayed in 'history' play mode in accordance with a created time of the corresponding memo object.

FIG. 12 is a state diagram to describe that each memo object is sequentially displayed in 'history' play mode in accordance with a created time of the corresponding memo object.

Referring to FIG. 12, in the '3. History' play mode, the controller 180 sequentially displays memo objects of 'Shopping list', '1. Roll paper', '2. Ketchup' and '3. Milk' in order of created times of the memo objects. In doing so, the controller 180 can output an indicator 1201 indicating 'History' play mode together with the outputs of the memo objects.

When 'Shopping list' is displayed, the controller 180 can display an audio memo object linked to the 'Shopping list' together with the 'Shopping list'.

Moreover, the controller can record and save a scene of inputting the handwritten memo objects. If the 'History' play mode is selected, the controller 180 can replay and display the saved scene. Referring to FIG. 12 (*a*) and FIG. 12 (*b*), it can be observed that a scene of inputting 'Shopping list' as a handwritten memo object. In particular, a process for completing the handwritten memo object in proportion to a progressive extent of the progressive bar 803 is replayed.

In more particular, for the replay, the controller 180 can record a displayed screen as a video. Alternatively, when a memo is inputted, the controller 180 saves a time information on the corresponding touch input of a user together with the memo. If the 'History' play mode is selected, the controller 180 can replay the corresponding scene in consideration of the saved time information.

Referring to FIG. 12 (*c*) and FIG. 12 (*d*), memo objects are displayed in 'History' play mode in created order. Thus, first to last memo objects can be replayed in the created order.

Besides, as mentioned in the foregoing description, when an audio memo object is played, it can be played together with the progressive bar 803.

In the '4. Time back' play mode, the controller 180 plays audio data recorded in normal memo mode before entering a multi-memo. In particular, according to an embodiment of the present invention, the controller 180 receives an input of a memo in normal memo mode. If the normal memo mode is switched to a multi-memo mode, the controller 180 can save an audio input by activating the microphone 122 in response to a user's input. On the other hand, according to another embodiment of the present invention, the controller 180 activates the microphone 122 in normal memo mode and then saves an audio input as a preliminary audio memo object until a multi-memo mode is entered from the corresponding activation. Subsequently, in case of receiving an input of switching to the multi-memo mode, the controller 180 can save the preliminary audio memo object together with audio memo objects of the multi-memo mode. Thereafter, in case that audio memo objects included in the memo sheet are played in '4. Time back' mode, the controller 180 can output the preliminary audio memo object as well as the audio memo objects. When the preliminary audio memo object is outputted, the controller 180 can display an indicator indicating that the preliminary audio memo object is currently outputted.

Figure 13:
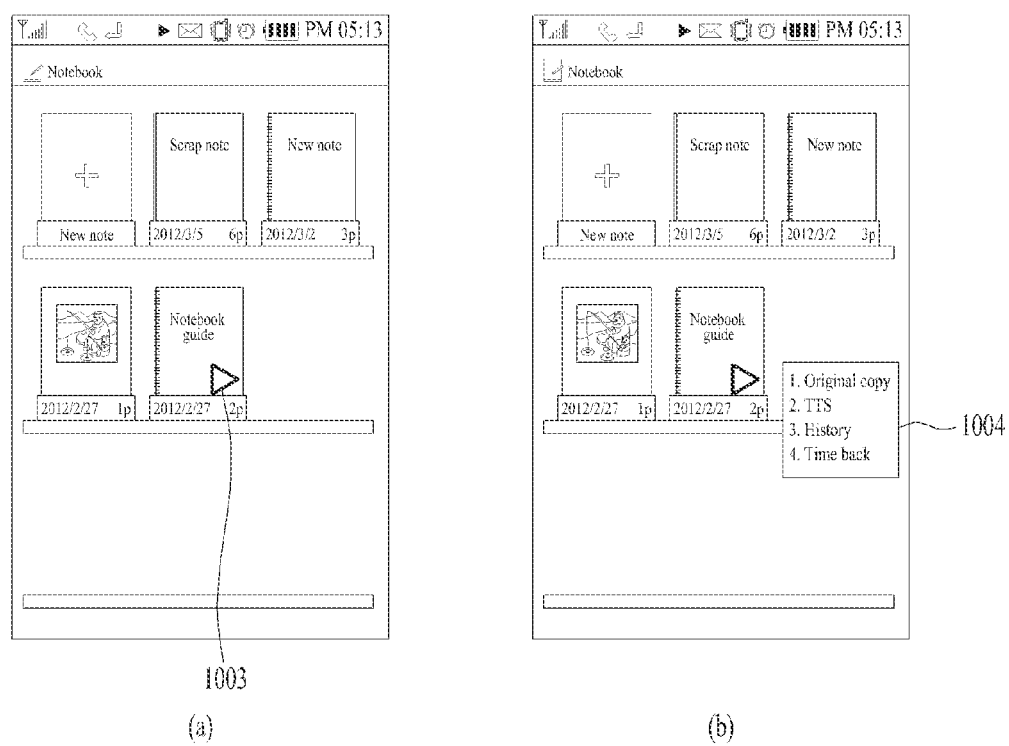
FIG. 13 is a diagram for another example of playing an audio memo object in a memo list state according to one embodiment of the present invention.

FIG. 13 is a diagram for another example of playing an audio memo object in a memo list state according to one embodiment of the present invention. FIG. 13 (*a*) is a diagram of a memo list displayed in notebook format in application memo mode, which is identical to the foregoing description with reference to FIG. 3. In case that a memo saved in a notebook is a multi-memo, the controller 180 can output an indicator 1103 indicating the multi-memo in a playlist. The controller 180 can output a play mode list 1104 in response to an input of a touch to the indicator 1103, which is identical to the foregoing description with reference to FIG. 11.

So far, a method of playing an audio memo object included in a saved memo sheet is displayed. In the following description, a method of searching for a memo object and an audio memo object included in a memo sheet is explained.

[Search for Memo Object]

According to an embodiment of the present invention, the controller 180 receives an input of a search word from a user, searches for a memo object including the inputted search word and an audio memo object including the inputted search word, and then displays the found memo object and/or the found audio memo object on the display unit.

Figure 14B:
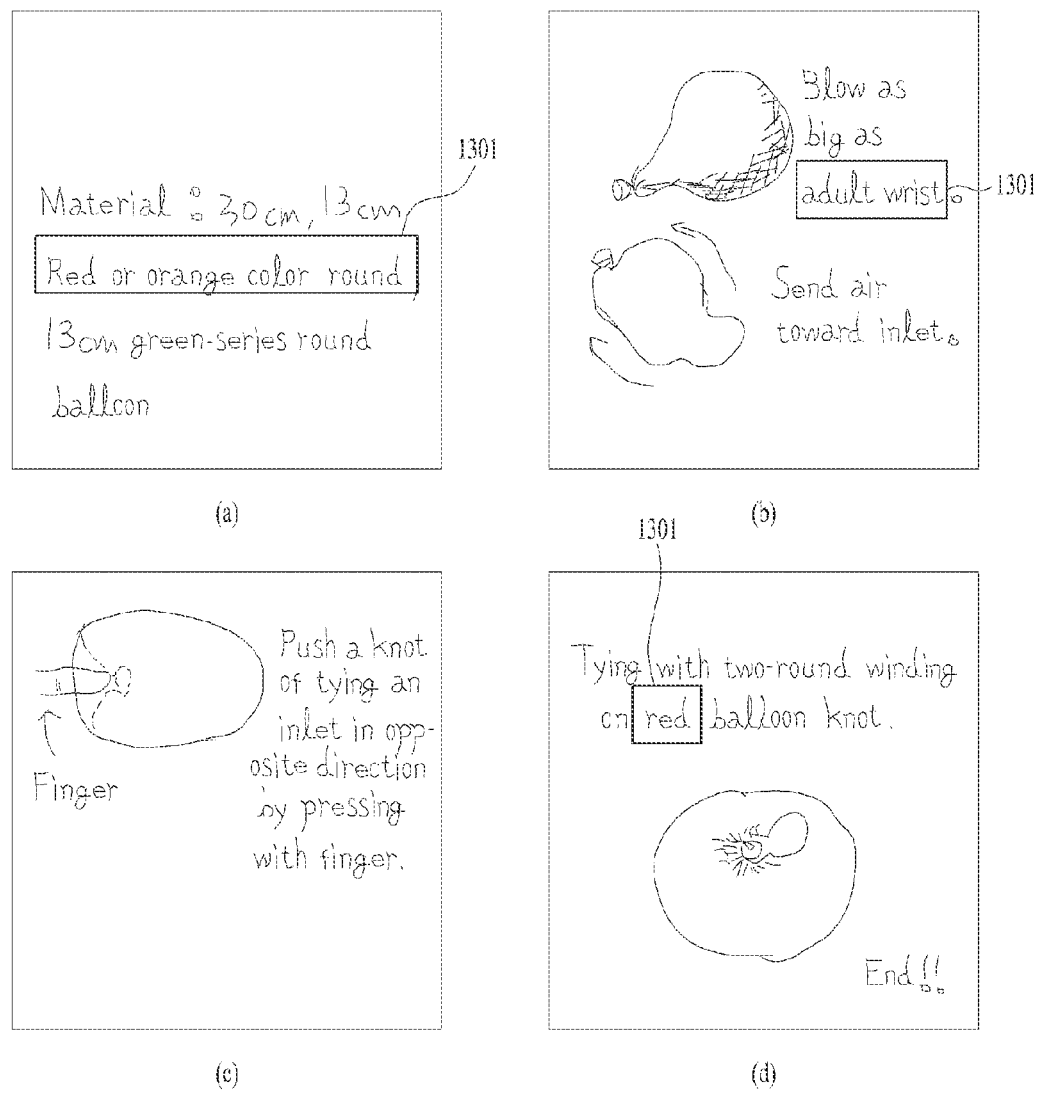

FIG. 14A and FIG. 14B are diagrams for one example of a method of searching objects according to one embodiment of the present invention.

FIG. 14A (*a*) to FIG. 14A (*d*) show memo sheets saved in a notebook. And, assume that a memo object and an audio memo object linked to the memo object are included in each of the memo sheets. For clarity of the following description, assume that audio memo objects respectively linked to memo objects in the memo sheet are as good as shown in Tables 1 to 4. Each of the audio memo objects included in the following tables may include a result from converting a user's voice (speech) inputted via the microphone 122 by voice recognition.

TABLE 1

| Memo objects of memo sheet (a) | Linked audio memo objects |
|---|---|
| Materials: 30 cm, 13 cm | None |
| Red or orange color round | Red round balloon big or small |
| 13 cm green-series round balloon | Green round balloon small |

TABLE 2

| Memo objects of memo sheet (b) | Linked audio memo objects |
|---|---|
| Adult wrist | Red balloon as big as adult wrist |
| Blow | Blow |
| Send air toward inlet | Send air toward inlet by pressing with hand |

TABLE 3

| Memo objects of memo sheet (c) | Linked audio memo objects |
|---|---|
| Push a knot of tying an inlet in opposite direction by pressing with finger | None |

TABLE 4

| Memo objects of memo sheet (d) | Linked audio memo objects |
|---|---|
| On red balloon knot Tying with two-round winding | To twisted-twice knot Completed if green balloon is tied up |

According to one embodiment of the present invention, the controller 180 can receive an input of a search word from a user. In this case, the search word is a text a user intends to find in a memo object or an audio memo object. The controller 180 can receive an input of the search word through a typing or handwriting input. Alternatively, the controller 180 receives an input of a user voice and is then able to use a result from voice recognition of the input as the search word.

According to one embodiment of the present invention, the controller 180 can provide two kinds of search results using a search word inputted by a user.

According to a first search result, the controller 180 detects whether a search word is included in a typed or handwritten memo object by search and is then able to provide a result of displaying the typed or handwritten memo object including the search word in a manner that the corresponding memo object is discriminated from other memo objects.

According to a second search result, the controller 180 detects whether an inputted search word is included in an audio memo object and is then able to provide a result of displaying a memo object linked to the audio memo object including the search word in a manner that the corresponding memo object is discriminated from other memo objects.

For instance, assume that the controller 180 receives an input of a search word 'red' from a user through a text or voice.

According to one embodiment of the present invention, the controller 180 can search for a handwritten memo object including a word 'red'. Since a memo object 'to red balloon knot' includes the search word among the memo objects shown in FIG. 14A (d), the controller 180 can display an indicator 1301 indicating that the search word is included in the corresponding memo object [FIG. 14B (d)].

According to one embodiment of the present invention, the controller 180 can search for an audio memo object including a word 'red'. If the controller 180 finds the audio memo object including the corresponding search word with reference to Tables 1 to 4, the controller 180 can find one audio memo object included in the memo sheet (a) shown in FIG. 14A and another audio memo object included in the memo sheet (b) shown in FIG. 14A. If so, the controller 180 can display an indicator 1301 indicating that the search word is included in the audio memo object linked to the memo object [FIG. 14B (a), FIG. 14B (b)].

In brief, the controller 180 can search for a typed, handwritten or audio memo object including an inputted search word. The controller 180 can search for the typed, handwritten and audio memo objects collectively. Alternatively, the controller 180 can search for an audio memo object only in 'audio memo object search mode' depending on a search mode. Alternatively, the controller 180 can search for a typed memo object and/or a handwritten memo object only in 'memo object search mode'.

Furthermore, as mentioned in the foregoing description, if the controller 180 receives an input of a touch to a memo object having the indicator 1301 displayed thereon, the controller 180 can play an audio memo object linked to the touched memo object in response to the corresponding input. So far, as a method of providing a result of a search for a memo object and an audio memo object, a method of identifiably displaying an object including a search word in a memo sheet is described. Alternatively, it is able to provide a method of providing a search result as a list according to an embodiment of the present invention. How to provide a search result as a list is described with reference to FIG. 15 as follows.

FIG. 15 is a diagram for one example of a state diagram of displaying a list of memo object including a search word according to one embodiment of the present invention.

Referring to FIG. 15, if a search word 'red' is inputted for the memo sheets exampled in FIG. 14, the controller 180 can output a search result as a list [FIG. 15 (*a*)]. The controller 180 can display a memo object including the search word and an audio memo object including the search word on the list. In case that the memo object is a handwritten memo object, the controller 180 can control handwritten memo objects 1401-1 to 1401-3 themselves to be included in the list. And, the controller 180 can display TSS converted results 1402-1 to 1402-3 of audio memo objects respectively linked to the included handwritten memo objects on the list as well. A play icon 1403 can be displayed on each list. If the play icon 1403 is touched, the controller 180 can play the audio memo object linked to the corresponding memo object in response to the touch input.

If a prescribed one in the list is touched shown in FIG. 15 (*a*), the controller 180 can display a memo sheet including the touched memo object on the display unit 151 in response to the touch input. In this case, as mentioned in the foregoing description, the memo object including the search word can be identifiably displayed using an indication 1301.

Figure 16:
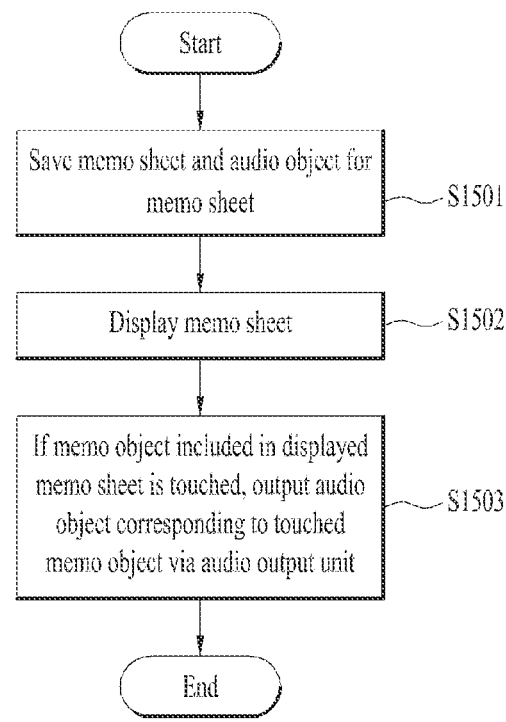
FIG. 16 is a flowchart for one example of an audio memo object playing method according to one embodiment of the present invention.

FIG. 16 is a flowchart for one example of an audio memo object playing method according to one embodiment of the present invention.

Referring to FIG. 16, the controller 180 saves a memo sheet including a memo object and an audio memo object for the memo sheet [S1501]. Subsequently, the controller 180 displays the saved memo sheet on the display unit 151 [S1502]. In this case, at least one or more memo objects included in the memo sheet can be displayed on the display unit 151.

If receiving an input of a touch to a prescribed one of the memo objects included in the memo sheet, the controller 180 can output an audio memo object corresponding to the touched memo object via the audio output module 152 in response to the received input.

Accordingly, embodiments of the present invention provide various effects and/or features.

According to at least one of embodiments of the present invention, when a memo is read using a memo function of a mobile terminal, an audio content can be easily read.

In particular, before an audio content included in a memo is saved, a mobile terminal divides a continuously recorded audio content into a plurality of audio contents in accordance t\with continuity of voice waveforms. Subsequently, the mobile terminal saves a plurality of the divided audio contents in a manner that a plurality of the divided audio contents are linked to other memo objects, respectively. When a user reads the above-saved memo, if one of the memo objects are clicked, the mobile terminal can play the clicked memo object and the linked audio memo object together, thereby enhancing user's convenience.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
  a touchscreen;
  an audio input unit;
  an audio output unit;
  a memory unit configured to store a first memo sheet including at least one memo object and at least one audio memo object for the first memo sheet; and a controller configured to:
  cause the touchscreen to display the first memo sheet;
  cause the audio output unit to output an audio memo object corresponding to one of the at least one memo object in response to selection of the one of the at least one memo object from the first memo sheet;
  cause the touchscreen to display multiple memo objects and multiple voice memo objects sequentially according to a created time of each of the multiple memo objects, each of the multiple voice memo objects corresponding to respective one of the multiple memo objects; and
  cause the audio output unit to output the multiple voice memo objects sequentially while the touchscreen displays a progressive bar respectively corresponding to one of the multiple memo objects and respectively corresponding to one of the multiple voice memo objects being output sequentially such that a different length of progressive bar is displayed for a different voice memo object among the multiple voice memo objects in response to selection of playback for the multiple voice memo objects.

2. The mobile terminal of claim 1, wherein the at least one audio memo object is stored in the memory unit in a manner of being included in the first memo sheet or linked to a corresponding memo object separately from the first memo sheet, wherein a first number of memo objects and a second number of audio memo objects are stored in the memory unit, and wherein the second number is equal to or smaller than the first number.

3. The mobile terminal of claim 1, wherein the controller is further configured to cause the touchscreen to display the one of the multiple memo objects visually distinguishably from others among the multiple memo objects while the one of the multiple voice memo objects corresponding to the one of the multiple memo objects being output via the audio output unit.

4. The mobile terminal of claim 1, wherein the at least one memo object comprises at least one selected from the group consisting of a typed memo object, a handwritten memo object and a video memo object.

5. The mobile terminal of claim 4, wherein the memory unit is further configured to store a plurality of memo sheets including the first memo sheet, and wherein the controller is further configured to:
  cause the touchscreen to display a list of the plurality of the memo sheets; and
  cause the touchscreen to display the first memo sheet in response to selection of the first memo sheet from the list.

6. The mobile terminal of claim 5, wherein the controller is further configured to cause the touchscreen to display the first memo sheet associated with the at least one audio memo object visually distinguishably from a second memo sheet that is not associated with an audio memo object.

7. The mobile terminal of claim 5, wherein the sequential outputting of the multiple voice memo objects is synchronized with the sequential displaying of the multiple memo objects such that displaying of a first memo object among the multiple memo objects is synchronized with outputting of a first voice memo object among the multiple voice memo objects and displaying of a second memo object among the multiple memo objects is synchronized with outputting of a second voice memo object among the multiple voice memo objects.

8. The mobile terminal of claim 5, wherein:
  the memory unit is further configured to store a preliminary audio memo object not corresponding to the at least one memo object, the preliminary audio memo object corresponding to a second memo sheet selected from the plurality of memo sheet; and
  the controller is further configured to cause the touchscreen to display the selected second memo sheet and cause the audio output unit to output the preliminary audio memo object while the second memo sheet is displayed.

9. The mobile terminal of claim 5, wherein each of the at least one memo object and the at least one audio memo object includes information related to time when a respectively corresponding one of the at least one memo object and the at least one audio memo object was created.

10. The mobile terminal of claim 9, wherein the one of the at least one memo object is associated with the corresponding audio memo object based on the information related to the created time.

11. The mobile terminal of claim 9, wherein the one of the at least one memo object is associated with the corresponding audio memo object having created time information that is within a preset time period from created time information of the one of the at least one memo object.

12. The mobile terminal of claim 9, wherein the controller is further configured to cause the touchscreen to display the at least one audio memo object for the selected first memo sheet sequentially based on the information related to the created time of the at least one audio memo object in response to a first user command.

13. The mobile terminal of claim 12, wherein while the at least one audio memo object is sequentially outputted, the controller is further configured to cause the touchscreen to display a memo object corresponding to a currently outputted audio memo object visually distinguishably from others among the at least one memo object.

14. The mobile terminal of claim 13, wherein the controller is further configured to cause the touchscreen to display the memo object corresponding to the currently outputted audio memo object visually distinguishably by further displaying a progressive bar for the memo object corresponding to the currently outputted audio memo object such that no progressive bars are displayed for the others among the at least one memo object while the progressive bar for the memo object corresponding to the currently outputted audio memo object is displayed.

15. The mobile terminal of claim 14, wherein the controller is further configured to control a length of the progressive bar to be proportional to a play time of the currently outputted audio memo object.

16. The mobile terminal of claim 5, wherein the controller is further configured to:
cause the touchscreen to display the at least one audio memo object for the selected first memo sheet sequentially according to a specific arrangement sequence of memo objects corresponding to the at least one audio memo object in response to a second user command; and
change an output sequence of the at least one audio memo object when the specific arrangement sequence of the memo objects is changed.

17. The mobile terminal of claim 5, wherein when a search word is inputted, the controller is further configured to sort at least one of all memo objects corresponding to the search word and all audio memo objects corresponding to the search word for at least one portion of the plurality of the memo sheets.

18. The mobile terminal of claim 17, wherein the search word is input via a soft keypad displayed on the touchscreen or or input as a voice via the audio input unit.

19. The mobile terminal of claim 1, wherein the controller is further configured to:
cause the touchscreen to display a second memo sheet newly created in response to user input, the second memo sheet including a first memo object; and
cause the memory unit to store a voice inputted via the audio input unit as a first audio memo object such that the first audio memo object is associated with the first memo object.

20. A method for controlling a mobile terminal, comprising:
storing a first memo sheet including at least one memo object and at least one audio memo object for the first memo sheet;
display the first memo sheet on a touchscreen;
outputting an audio memo object via an audio output unit, the audio memo object
corresponding to one of the at least one memo object, in response to selection of the one of the at least one memo object from the first memo sheet;
displaying, on the touchscreen, multiple memo objects and multiple voice memo objects sequentially according to a created time of each of the multiple memo objects, each of the multiple voice memo objects corresponding to respective one of the multiple memo objects; and
outputting, via the audio output unit, the multiple voice memo objects sequentially while the touchscreen displays a progressive bar respectively corresponding to one of the multiple memo objects and respectively corresponding to one of the multiple voice memo objects being output sequentially such that a different length of progressive bar is displayed for a different voice memo object among the multiple voice memo objects in response to selection of playback for the multiple voice memo objects.

* * * * *